US012276817B2

(12) United States Patent
French et al.

(10) Patent No.: US 12,276,817 B2
(45) Date of Patent: Apr. 15, 2025

(54) DISPLAY DEVICE

(71) Applicant: E Ink Holdings Inc., Hsinchu (TW)

(72) Inventors: Ian French, Hsinchu (TW); Po-Yuan Lo, Hsinchu (TW); Xian-Teng Chung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 313 days.

(21) Appl. No.: 17/147,442

(22) Filed: Jan. 12, 2021

(65) Prior Publication Data

US 2021/0286115 A1 Sep. 16, 2021

(30) Foreign Application Priority Data

Mar. 11, 2020 (TW) .................................. 109107993

(51) Int. Cl.
*G02B 5/20* (2006.01)
(52) U.S. Cl.
CPC .................................... *G02B 5/201* (2013.01)
(58) Field of Classification Search
CPC ...................................................... G02B 5/201
See application file for complete search history.

(56) References Cited

U.S. PATENT DOCUMENTS

| 7,859,512 | B2 | 12/2010 | Yuasa |
| 8,565,522 | B2 | 10/2013 | Swic |
| 9,122,120 | B2 | 9/2015 | Shu et al. |
| 10,185,172 | B2 | 1/2019 | Kadowaki et al. |
| 2008/0055525 | A1* | 3/2008 | Igeta ................. G02F 1/133555 349/114 |
| 2013/0003004 | A1* | 1/2013 | Shimizu ............ G02F 1/133707 349/130 |
| 2015/0355522 | A1* | 12/2015 | Lee ......................... G02F 1/167 359/296 |
| 2016/0104448 | A1 | 4/2016 | Lee et al. |
| 2016/0190212 | A1* | 6/2016 | Takii ...................... H10K 59/38 257/40 |

(Continued)

FOREIGN PATENT DOCUMENTS

| CN | 103744224 A | 4/2014 |
| CN | 105742318 A | 7/2016 |

(Continued)

OTHER PUBLICATIONS

Corresponding Taiwan office action issued on Dec. 8, 2020.
Corresponding Chinese office action issued on Aug. 29, 2022.

*Primary Examiner* — Sean M DeGuire
*Assistant Examiner* — Jayson D Cosgrove
(74) *Attorney, Agent, or Firm* — CKC & Partners Co., LLC

(57) ABSTRACT

A display device includes a display area, a pixel array, a display medium layer, and a color filter layer. The display area includes a plurality of sub-pixel regions, and each of the sub-pixel regions has a length and a width that are substantially the same. The pixel array corresponds to the display area in position. The display medium layer is located on the pixel array. The color filter layer includes a plurality of color resists. The color resists are arranged along a first direction and a second direction different from the first direction. Two adjacent color resists arranged along the first direction have different colors, two adjacent color resists arranged along the second direction have different colors, and adjacent two of the color resists are spaced apart from each other.

15 Claims, 7 Drawing Sheets

(56) References Cited

U.S. PATENT DOCUMENTS

| | | | |
|---|---|---|---|
| 2016/0238900 A1* | 8/2016 | Tseng | G02F 1/13452 |
| 2017/0031227 A1 | 2/2017 | Lo et al. | |
| 2017/0236807 A1* | 8/2017 | Hwang | H01L 33/0075 |
| | | | 257/90 |
| 2019/0041691 A1* | 2/2019 | Chen | G02F 1/133512 |
| 2019/0163005 A1* | 5/2019 | Hsu | H10K 59/38 |

FOREIGN PATENT DOCUMENTS

| | | |
|---|---|---|
| CN | 106932985 A | 7/2017 |
| CN | 108227284 A | 6/2018 |
| CN | 108288620 A | 7/2018 |
| TW | 200842437 A | 11/2008 |
| TW | 201516522 A | 5/2015 |

\* cited by examiner

DISPLAY DEVICE

CROSS-REFERENCE TO RELATED APPLICATION

This application claims priority to Taiwan Application Serial Number 109107993, filed Mar. 11, 2020, which is herein incorporated by reference in its entirety.

BACKGROUND

Field of Invention

The present invention relates to a display device.

Description of Related Art

Stripe color resists are commonly utilized to enhance color saturation and resolution of the reflective display device with color filter layer nowadays. However, stripe color resists may cause line mura problem and limit view angle. In addition, if when non-square sub-pixel are utilized for displaying texts, deformation of the figure (elongation or shortening) when the display device is viewed from different sights may occur.

Accordingly, it is still a development direction for the industry to provide a display device which may solve the problems above while maintaining color saturation and improving resolution.

SUMMARY

The invention provides a display device.

In some embodiments, the display device includes a display area, a pixel array, a display medium layer, and a color filter layer. The display area includes a plurality of sub-pixel regions, and each of the sub-pixel regions has a length and a width that are substantially the same. The pixel array corresponds to the display area in position. The display medium layer is located on the pixel array. The color filter layer includes a plurality of color resists. The color resists are arranged along a first direction and a second direction different from the first direction. Two adjacent color resists arranged along the first direction have different colors, two adjacent color resists arranged along the second direction have different colors, and adjacent two of the color resists are spaced apart from each other.

In some embodiments, the color filter layer further includes a plurality of empty regions located between the color resists.

In some embodiments, a width of each of the color resists is smaller than a width of each of the sub-pixel regions.

In some embodiments, a length of each of the color resists is greater than a length of each of the sub-pixel regions.

In some embodiments, each of the color resists has a rectangular shape and two short edges, and a ratio between a length of each of the two short edges and the width of each of the sub-pixel regions is located in a range from about 35% to 55%.

In some embodiments, each of the color resists has a rectangular shape and two long edges, and a length of each of the short edges is located in a range from about 160 micrometers to 500 micrometers.

In some embodiments, each of the color resists has a rectangular shape and two short edges, and each of the two short edges are spaced apart from a junction of the sub-pixel regions.

In some embodiments, each of the color resists has a rectangular shape and two long edges, and each of the two long edges are spaced apart from a junction of the sub-pixel regions.

In some embodiments, the first direction is substantially perpendicular to the second direction.

In some embodiments, the first direction is the diagonal direction of the display region.

In some embodiments, each of the color resists is symmetric along the direction.

In some embodiments, each of the color resists has a plurality of short edges, and two of the short edges are aligned with the junctions of the sub-pixel regions.

In some embodiments, a ratio between a length of each of the short edges and the width of the sub-pixel regions is located in a range from about 35% to 55%.

In some embodiments, the color resists has a cross-shaped region in the sub-pixel region.

In some embodiments, each of the color resists further includes two extension portions respectively extending from the cross-shaped region toward a third direction and the second direction, the third direction is substantially perpendicular to the second direction, and the third direction is different from the first direction.

In some embodiments, a length of each of the color resists along the second direction is substantially equal to a length of each of the color resists along the third direction.

In some embodiments, a length of each of the color resists along the second direction and a length of each of the color resists along the third direction are greater than the width of each of the sub-pixels.

In the aforementioned embodiments, since there are color resists with different colors arranged along the first direction and the second direction, the line mura problem caused by the typical stripe color resists may be prevented. By driving each of the sub-pixel regions through the pixel array, the texts may be displayed with each of the sub-pixel regions as a display unit on the reflective display device which has a color filter layer. Therefore, the display device may display texts with sub-pixel resolution. In addition, the display device having a color filter layer of the present disclosure may display color figures and black (or gray) texts simultaneously, thereby improving text resolution and remain the figure resolution.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
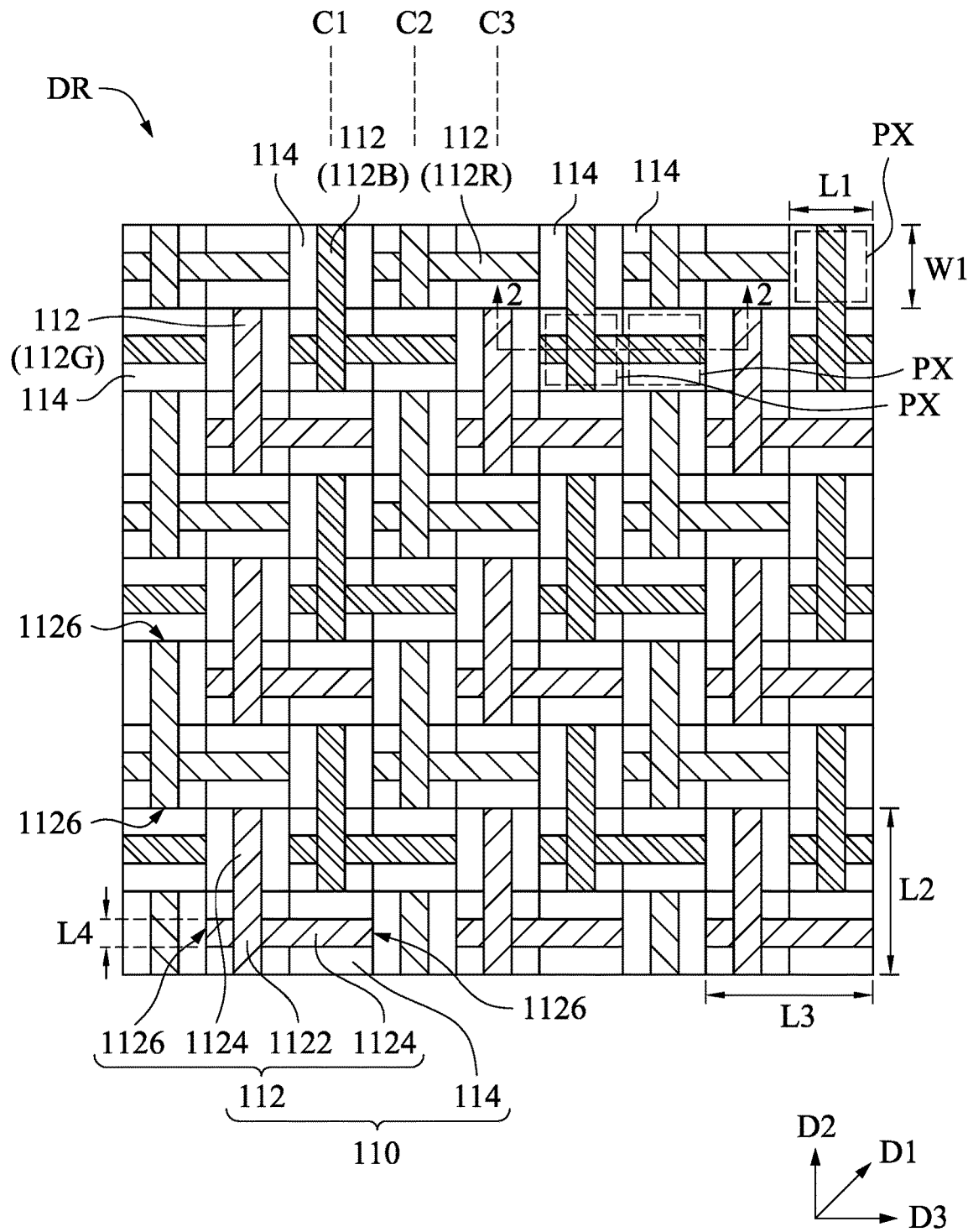
FIG. 1 is a top view of a display device according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

Figure 2:
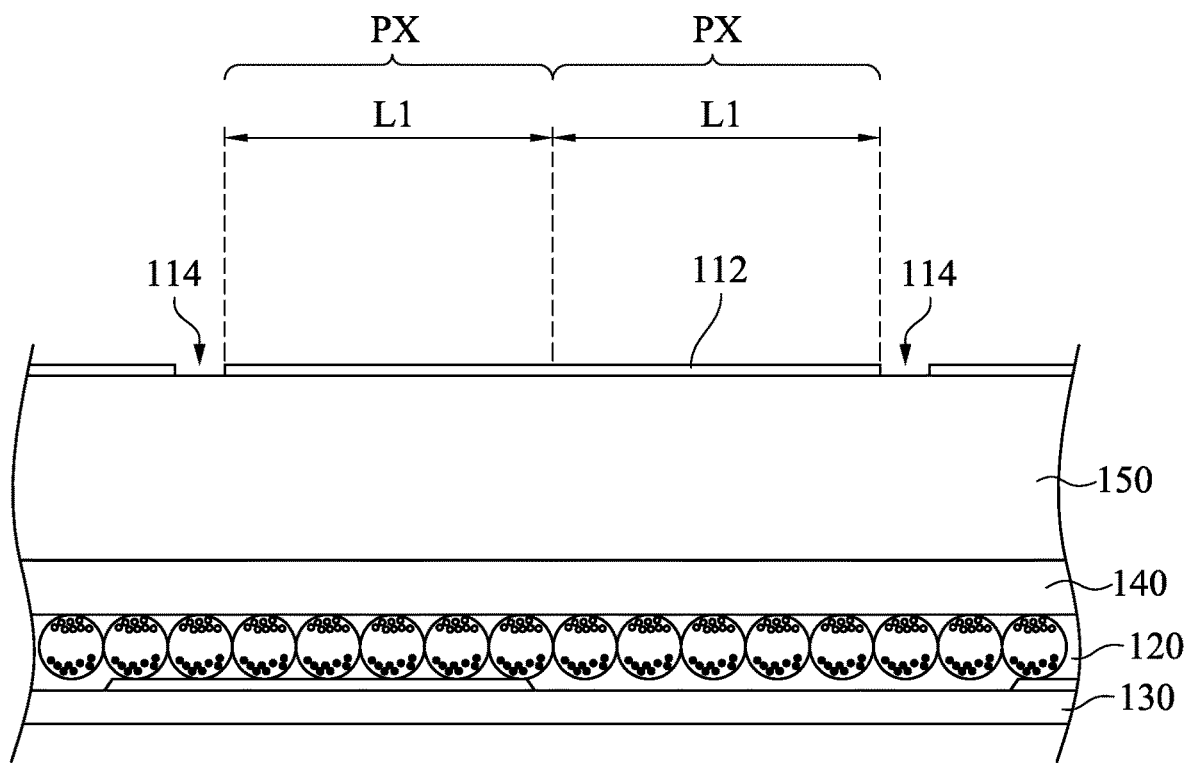
FIG. 2 is a cross-sectional view along the line 2-2 in FIG. 1.

FIG. 1 is a top view of a display device 100 according to one embodiment of the present disclosure. FIG. 2 is a cross-sectional view along the line 2-2 in FIG. 1. Reference is made to FIG. 1 and FIG. 2. The display device 100 includes a display area DR, a color filter layer 110, a display medium layer 120, and a pixel array 130. The display device 100 further includes a protection layer 140 and an adhesive layer 150. The protection layer 140 is located on the display medium layer 120, and the adhesive layer 150 is located between the protection layer 140 and color filter layer 110. The display area DR includes a plurality of sub-pixel regions PX, and each of the sub-pixel regions PX has a length L1 and a width W1 that are substantially the same. The pixel array 130 corresponds to the display area DR in position. The display medium layer 120 is located on the pixel array 130. The pixel array 130 includes a plurality of thin film transistor (TFT) configured to control each of the sub-pixel regions PX. The color filter layer 110 includes a plurality of color resists 112. The color resists 112 are arranged along a first direction D1 and a second direction D2 different from the first direction D1. In the present embodiment, the first direction D1 is the diagonal direction of the display region DR, and the second direction D2 is the horizontal direction or the vertical direction of the display region DR. In other words, the first direction D1 and the second direction D2 are alternate with each other but are not perpendicular or parallel with each other.

Reference is made to FIG. 1, in the present embodiment, a green resist 112G, a blue resist 112B and a red resist 112R are arranged along the first direction D1 subsequently, but the present embodiment is not limited in this regard. In addition, the blue resist 112B and the green resist 112G are arranged in a column C1 along the second direction D2 (the vertical direction as an example), the red resist 112R and the blue resist 112B are arranged in a column C2 along the second direction D2, and the red resist 112R and the green resist 112G are arranged in a column C3 along the second direction D2, but the present disclosure is not limited in this regard. In other words, there are color resists 112 with different colors arranged along the first direction D1 and the second direction D2. As such, the line mura problem caused by the typical stripe color resists may be prevented. In addition, the line mura problem along the diagonal direction may be reduced by arranging the color resists 112 along the first direction D1 (e.g., along the diagonal direction), thereby improving the display quality.

Two adjacent color resists 112 arranged along the first direction D1 and the second direction D2 have different colors, and adjacent two of the color resists 112 are spaced apart from each other. The color filter layer 110 further includes a plurality of empty regions 114 located between the color resists 112. In other words, color resists 112 are spaced apart from the empty regions 114. In the present embodiment, each of the color resists 112 has two short edges 1126, and a ratio between a length L4 of each of the two short edges 1126 and the width W1 of each of the sub-pixel regions PX is located in a range from about 35% to 55%. In addition, a ratio of an area of the color resist 112 overlapped with one of the sub-pixel regions PX and an area of the sub-pixel region PX is located in a range from about 40% to 60%. As such, by disposing an empty region 114, a portion of the light passing through the empty region 114 can be prevented form being weakened, thereby increasing the reflectivity of the figure displayed by the sub-pixel regions PX.

In the present embodiment, the color resists 112 includes cross-shaped region 1122 in the sub-pixel regions PX and two extension portions 1124 extending from the cross-shaped region 1122. The two extension portions 1124 respectively extending from the cross-shaped region 1122 toward a third direction D3 and the second direction D2. The third direction D3 is substantially perpendicular to the second direction D2, and the third direction D3 is different from the first direction D1. In other words, the two extension portions 1124 extend along the horizontal direction and the vertical direction of the display region DR, and each of the color resists 112 is symmetric along the diagonal direction. A length L2 of each of the color resists 112 along the second direction D2 and a length L3 of each of the color resists 112 along the third direction D3 are greater than the width W1 and the length L1 of each of the sub-pixel regions PX, and the length L2 is substantially equal to the length L3. In the present embodiments, the length L2 and the length L3 are substantially twice of the width W1 (or the length L1) of the sub-pixel regions PX. Since the length L2 of each of the color resist 112 along the second direction D2 is substantially equal to the length L3 of each of the color resist 112 along the third direction D3, and the length L1 is substantially equal to the width W1 of the sub-pixel region PX, the deformation problem of the text or picture occurred when the display device is viewed from different sights can be prevented so as to improve the display quality. In addition, in the present embodiment, there may be a front light source having an incident light along the second direction D2. Therefore, 50% of the color resists 112 is parallel with the second direction D2, and the other 50% of the color resists 112 is perpendicular to the second direction D2, thereby providing a better color display.

In the present embodiment, the short edges 1126 of the color resists 112 are aligned with a junction between adjacent two of the sub-pixel regions PX, but the present embodiment is not limited in this regard. Specifically, since the sub-pixel region PX has a square shape, the color resists 112 has rectangular shapes (the cross-shaped may be considered as two alternating rectangular shapes), the extension portion 1124 extending along the horizontal direction of one of the color resists 112 is adjacent to the extension portion 1124 extending along the vertical portion of another color resists 112 or the cross-shaped region 1122. As such, adjacent two of the color resists 112 may be spaced apart by the empty region 114. In some other embodiments, the short edge 1126 may not be aligned with the junctions of the sub-pixel regions PX. Specifically, as long as the color resists 112 are surrounded by the empty regions 114, the light may not completely pass through the color resist 112 so as to increase the reflectivity.

Figure 3:
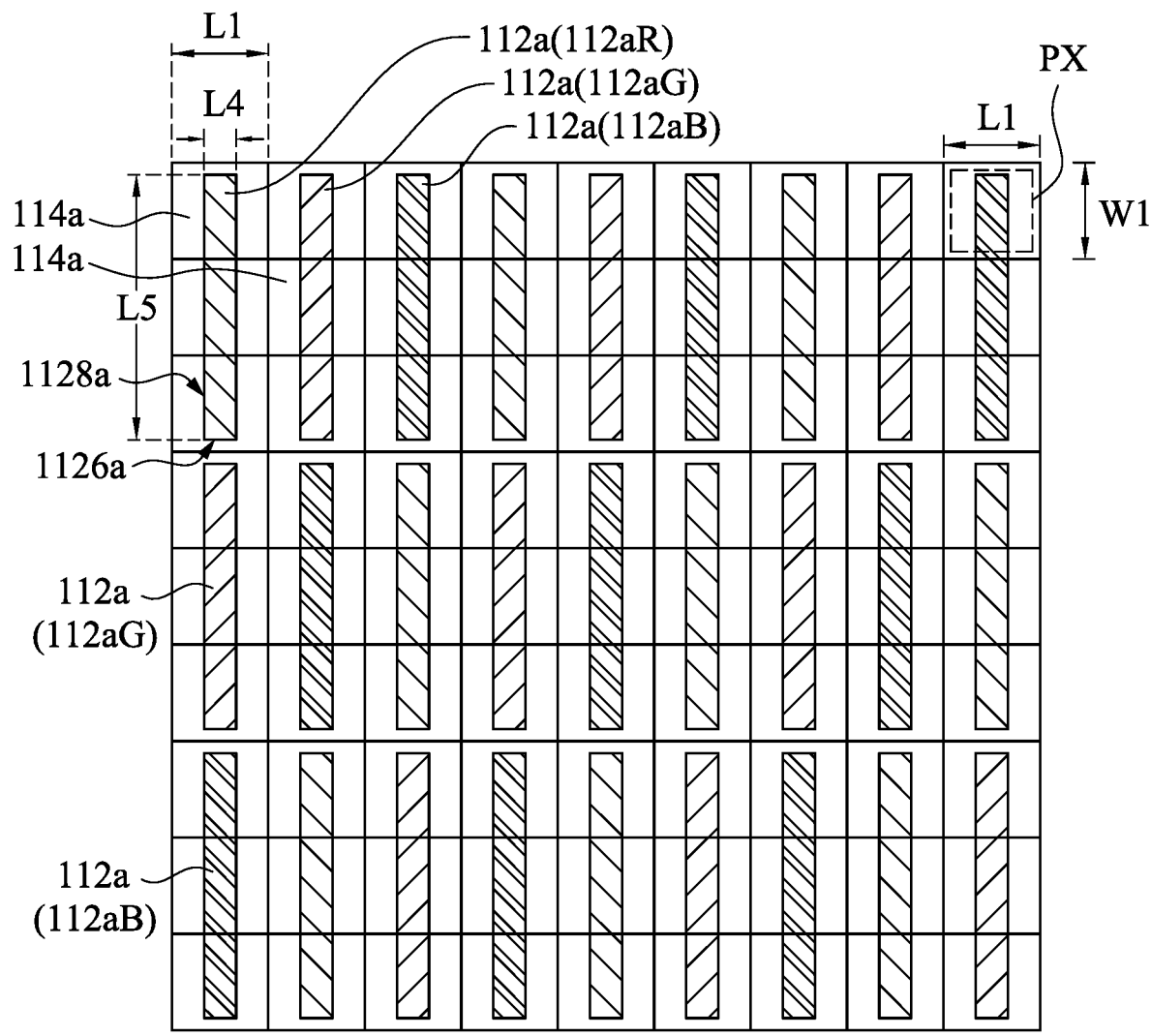
FIG. 3 is a top view of a display device according to one embodiment of the present disclosure.

FIG. 3 is a top view of a display device 100a according to one embodiment of the present disclosure. In the present embodiment, the color filter layer 110a of the display device 100a has color resists 112a that has rectangular shapes. The color resists 112a are arranged along the first direction D1 and the second direction D2, and the first direction D1 is substantially perpendicular to the second direction D2. In the present embodiment, the red resists 112aR, the green resists 112aG, and the blue resists 112aB are arranged along the first direction D1, but the present embodiment is not limited in this regard. In addition, the red resists 112aR, the green resists 112aG, and the blue resists 112aB are arranged along the second direction D2, but the present embodiment is not limited in this regard. In other words, there are color resists 112a with different colors arranged along the first direction D1 and the second direction D2. As such, the line mura problem caused by the typical stripe color resists may be prevented.

Each of the color resists 112a has two short edges 1126a and two long edges 1128a. A ratio between a length L4 of each of the two short edges 1126a and the length L1 (or the width W1) of the sub-pixel region PX is located in a range from about 35% to 55%. In addition, a ratio of an area of the color resist 112a overlapped with one of the sub-pixel regions PX and an area of the sub-pixel region PX is located in a range from about 40% to 60%. In the present embodiment, a length L5 of each of the two long edges 1128a of each of the color resists 112a is smaller than three times of the length L1 (or width W1) of the sub-pixel regions PX. The color filter layer 110a further includes a plurality of empty regions 114a located between the color resists 112a. In the present embodiment, the short edges 1126a are spaced apart from the junctions of the sub-pixel regions PX, and the long edges 1128a are spaced apart from the junctions of the sub-pixel regions PX. In other words, in the present embodiment, the color resists 112a are spaced apart by the empty regions 114a, and the junctions of the sub-pixel regions PX are overlapped with the empty regions 114a. As such, by disposing the empty regions 114a, a portion of the light does not pass through the color resists 112a, such that the portion of the light can be prevented from being weakened, thereby increasing the reflectivity of the figure displayed by the sub-pixel regions PX.

In addition, in comparison with the typical stripe color resists (that is, each row of the color resists has the same color), the length L4 of the short edges 1126a of the color resists 112a is closer to the length of the long edges 1128a of the color resists 112a. Therefore, the deformation problem of the text or picture occurred when the display device is viewed from different sights can be prevented so as to improve the display quality.

Figure 4:
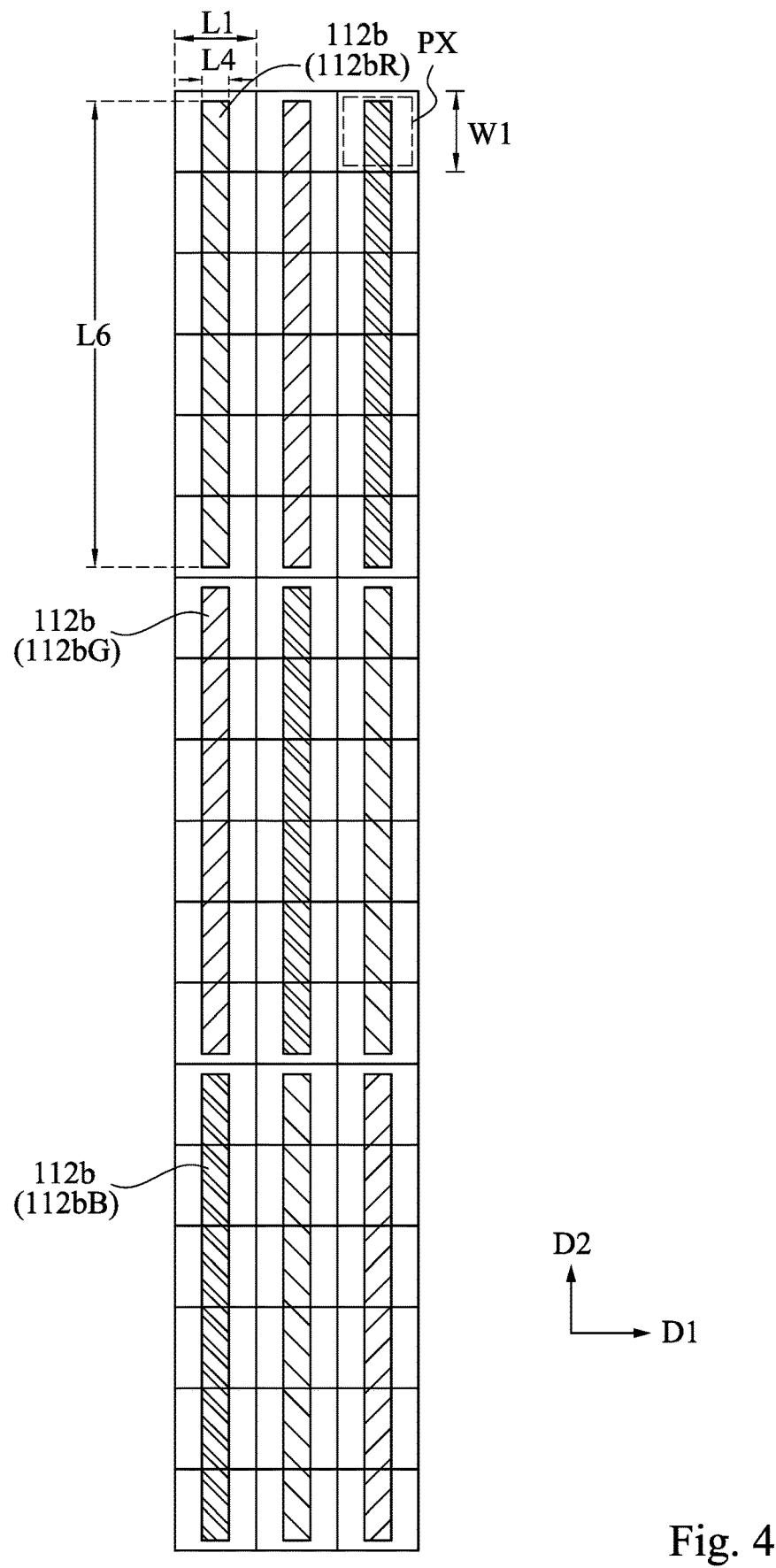
FIG. 4 is a top view of a display device according to one embodiment of the present disclosure.

FIG. 4 is a top view of a display device 100b according to one embodiment of the present disclosure. The display device 100b is substantially the same as the display device 100a shown in FIG. 3, the difference is that a length L6 of each of the color resists 112b of the display device 100b (including red resists 112bR, blue resists 112bB, and green resists 112bG) is greater the three times of the length L1 (or width W1) of the sub-pixel regions PX, thereby increasing the color saturation. In the present embodiment, the length L6 of the color resists 112b is located in a range from about 160 micrometers to 500 micrometers so as to prevent the line mura problem.

Figure 5:
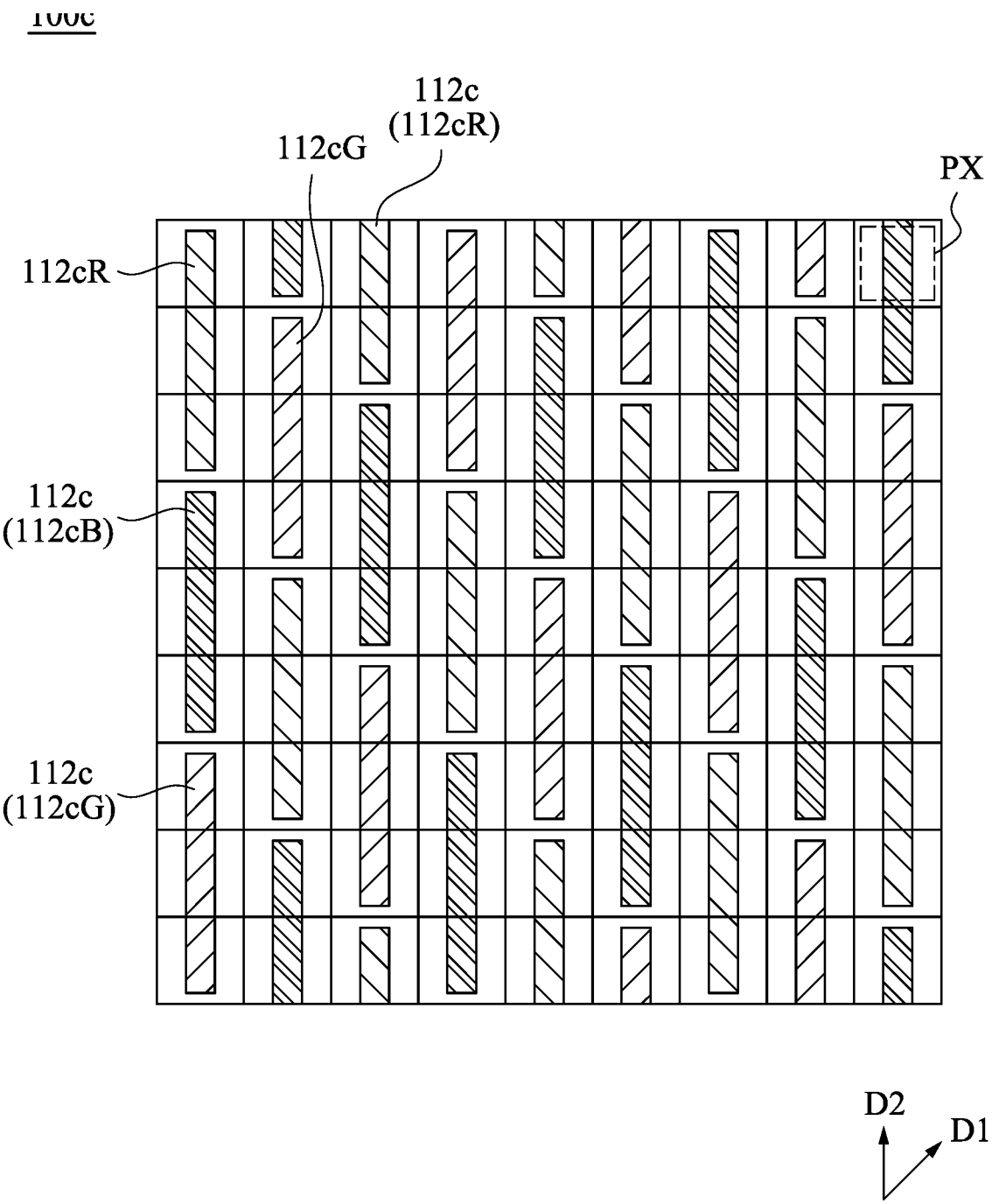
FIG. 5 is a top view of a display device according to one embodiment of the present disclosure.

FIG. 5 is a top view of a display device 100c according to one embodiment of the present disclosure. The color resists 112c are arranged along the first direction D1 and the second direction D2 different from the first direction D1. In the present embodiment, the first direction D1 is the diagonal direction of the display region DR, and the second direction D2 is the vertical direction of the display region DR. In the present embodiment, the blue resists 112cB, the green resists 112cG, and the red resists 112cR are subsequently arranged along the first direction D1, but the present disclosure is not limited in this regard. The blue resists 112cB, the green resists 112cG, and the red resists 112cR are also subsequently arranged along the second direction D2 (the vertical direction as an example), but the present disclosure is not limited in this regard. However, the second direction D2 may be another diagonal direction that is perpendicular to the first direction D1. For example, the blue resists 112cB, the green resists 112cG, and the red resists 112cR are subsequently arranged along the second direction D2 (the diagonal direction herein). In other words, there are color resists 112c with different colors arranged along the first direction D1 and the second direction D2. As such, the line mura problem caused by the typical stripe color resists may be prevented. In addition, the line mura problem along the diagonal direction may be reduced by arranging the color resists 112c along the diagonal direction, thereby improving the display quality.

In the present embodiment, the lengths and the widths of the color resists 112c may be the same as those of the color resists 112a, and the description is not repeated hereinafter. Accordingly, the display device 100c may has the advantage of increasing the color saturation of the sub-pixel regions PX. In addition, the deformation problem of the text or picture occurred when the display device is viewed from different sights can be prevented so as to improve the display quality.

Figure 6:
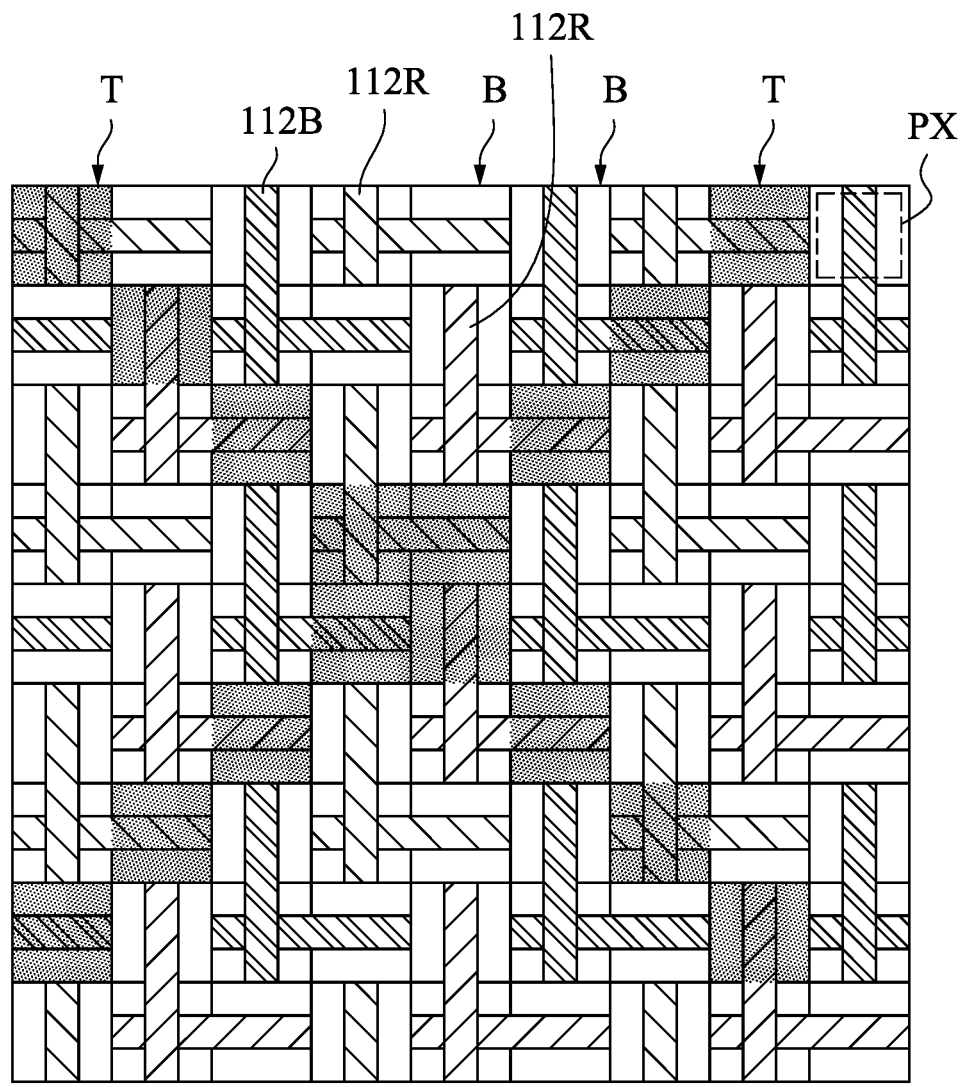
FIG. 6 is a top view of the display device in FIG. 1 used for displaying text on a whit background.

FIG. 6 is a top view of the display device 100 in FIG. 1 used for displaying text on a whit background. As shown in FIG. 6, the sub-pixel region T represents the sub-pixel region PX that is used for displaying texts, and the sub-pixel region B represents the sub-pixel region PX that is not used for displaying texts. The sub-pixel region T includes the sub-pixel regions PX that displays black or gray scale. That is, the light is not reflected or partially reflected in the sub-pixel region T. The sub-pixel region B includes the sub-pixel regions PX that display white. That is, the sub-pixel region B includes the sub-pixel regions PX that displays red color, green color, or blue color corresponding to the color resists 112. However, under the macroscopic view for human eyes, the sub-pixel regions B collectively display a white background, and the sub-pixel regions T may display black or gray scale texts.

Figure 7:
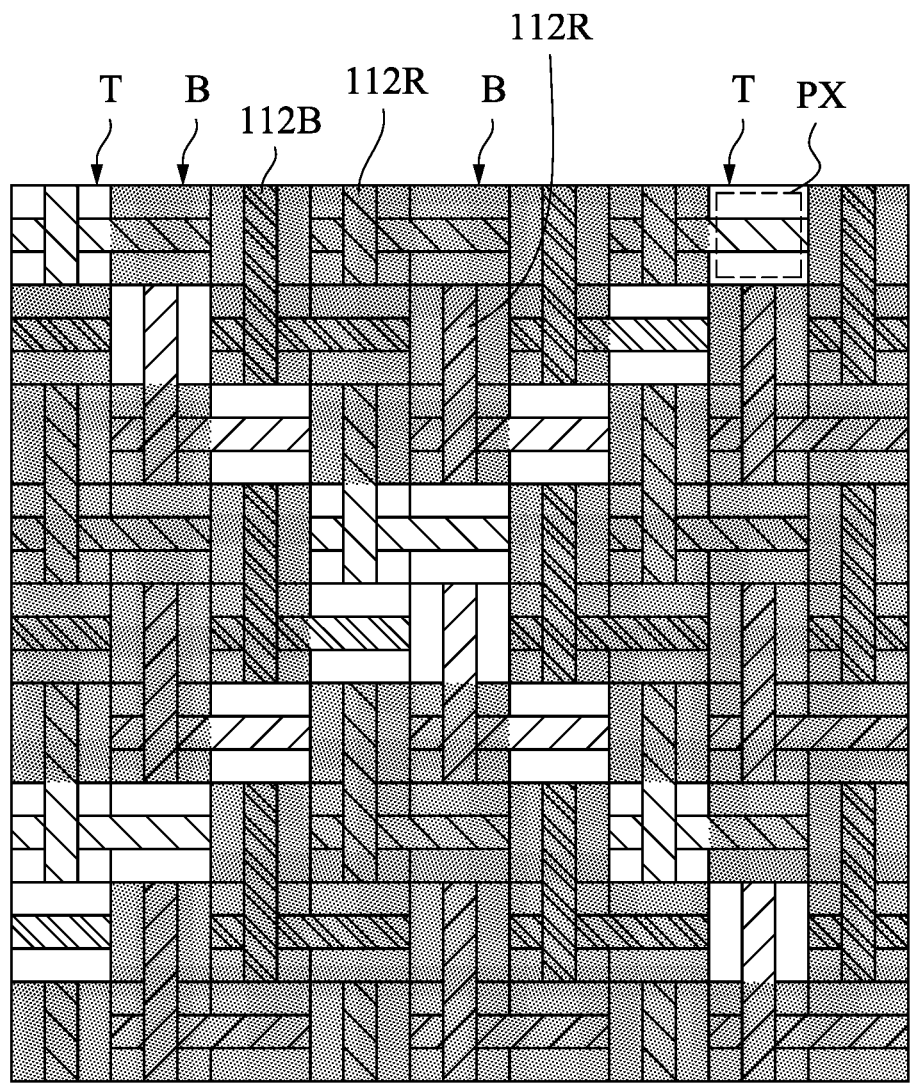
FIG. 7 is a top view of the display device in FIG. 1 used for displaying text on a black background.

FIG. 7 is a top view of the display device 100 in FIG. 1 used for displaying text on a black background. As shown in FIG. 7, the sub-pixel region T represents the sub-pixel region PX that is used for displaying texts, and the sub-pixel region B represents the sub-pixel region PX that is not used for displaying texts. The sub-pixel region B includes the sub-pixel regions PX that displays black or gray scale. That is, the light is not reflected or partially reflected in the sub-pixel region B. The sub-pixel region T includes the sub-pixel regions PX that display white. That is, the sub-pixel region B includes the sub-pixel regions PX that displays red color, green color, or blue color corresponding to the color resists 112. However, under the macroscopic view for human eyes, the sub-pixel regions T collectively display white texts, and the sub-pixel regions B may display black background.

According to texts displayed by the display device 100 shown in FIG. 6 and FIG. 7, by driving each of the sub-pixel regions PX through the pixel array 130, the black and white (or gray) texts may be displayed with each of the sub-pixel regions PX as a display unit on the reflective display device which has a color filter layer 110. Therefore, the display device 100 may display texts with sub-pixel resolution. Therefore, the display device 100 having a color filter layer 110 of the present disclosure may display color figures and black (or gray) texts simultaneously, thereby improving text resolution and remain the figure resolution.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device, comprising:
   a display area having a plurality of sub-pixel regions, wherein each of the sub-pixel regions has a length and a width that are substantially the same;
   a pixel array corresponding to the display area in position;
   a display medium layer located on the pixel array; and
   a color filter layer having a plurality of color resists and a plurality of empty regions located between the color resists, wherein the color resists are arranged along a first direction and a second direction different from the first direction, the first direction is the diagonal direction of the display area, the color resists has a cross-shaped region in the sub-pixel regions, two adjacent color resists arranged along the first direction have different colors, another two adjacent color resists arranged along the second direction have different colors, adjacent two of the color resists are spaced apart from each other, and each one of the sub-pixel regions overlaps the empty regions.

2. The display device of claim 1, wherein a width of each of the color resists is smaller than a width of each of the sub-pixel regions.

3. The display device of claim 1, wherein a length of each of the color resists is greater than a length of each of the sub-pixel regions.

4. The display device of claim 1, wherein each of the color resists has a rectangular shape and two long edges, and a length of each of the long edges is located in a range from about 160 micrometers to 500 micrometers.

5. The display device of claim 1, wherein each of the color resists has a rectangular shape and two short edges, and each of the short edges are spaced apart from a junction of the sub-pixel regions.

6. The display device of claim 1, wherein each of the color resists has a rectangular shape and two long edges, and each of the two long edges are spaced apart from a junction of the sub-pixel regions.

7. The display device of claim 1, wherein the first direction is substantially perpendicular to the second direction.

8. The display device of claim 1, wherein each of the color resists is symmetric along the first direction.

9. The display device of claim 8, wherein each of the color resists has a plurality of short edges, and two of the short edges are aligned with the junctions of the sub-pixel regions.

10. The display device of claim 9, wherein a ratio between a length of each of the short edges and the width of the sub-pixel regions is located in a range from about 35% to 55%.

11. The display device of claim 1, wherein each of the color resists further includes two extension portions respectively extending from the cross-shaped region toward a third direction and the second direction, the third direction is substantially perpendicular to the second direction, and the third direction is different from the first direction.

12. The display device of claim 11, wherein a length of each of the color resists along the second direction is substantially equal to a length of each of the color resists along the third direction.

13. The display device of claim 11, wherein a length of each of the color resists along the second direction and a length of each of the color resists along the third direction are greater than the width of each of the sub-pixel regions.

14. The display device of claim 1, wherein each of the color resists has a rectangular shape and two short edges, and a ratio between a length of each of the two short edges and the width of each of the sub-pixel regions is located in a range from about 35% to 55%.

15. The display device of claim 1, wherein a ratio of an area of each one of the color resists overlapped with the sub-pixel regions and an area of the sub-pixel regions is in a range from about 40% to 60%.

* * * * *